Figure 1:
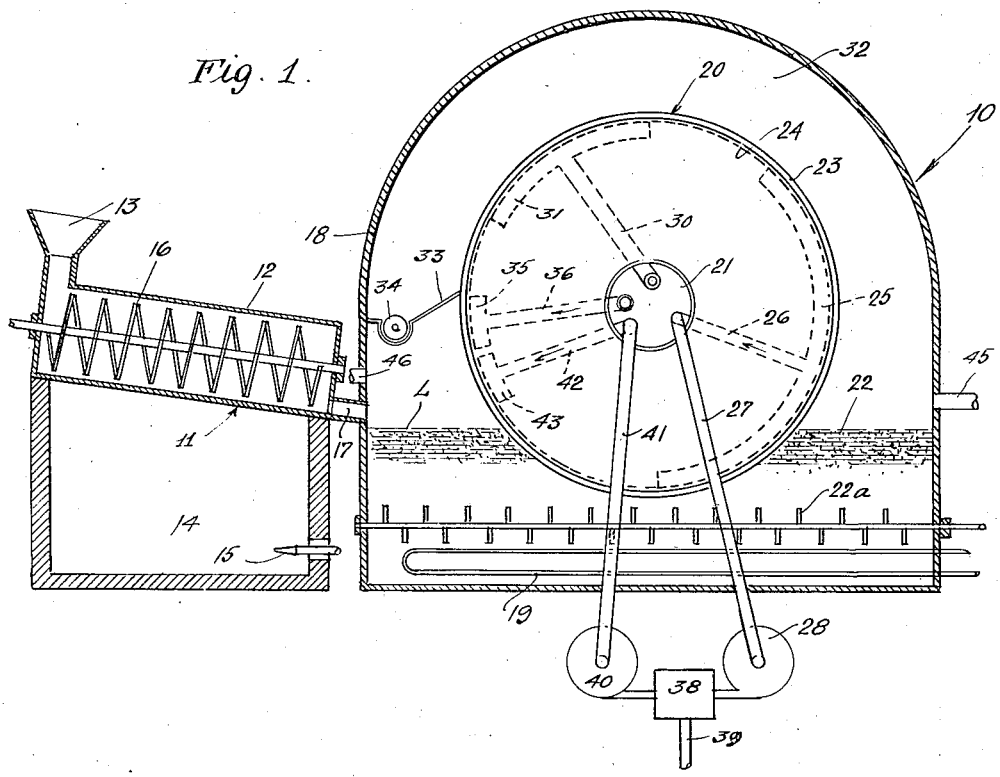

June 16, 1936.  C. W. JONES  2,044,214
SULPHUR REFINING PROCESS
Filed March 26, 1934   2 Sheets-Sheet 1

Inventor
Coulter W. Jones

Attorney

June 16, 1936.　　　C. W. JONES　　　2,044,214
SULPHUR REFINING PROCESS
Filed March 26, 1934　　2 Sheets-Sheet 2

Inventor
Coulter W. Jones
Attorney

Patented June 16, 1936

2,044,214

UNITED STATES PATENT OFFICE 2,044,214

SULPHUR REFINING PROCESS

Coulter W. Jones, Altadena, Calif.

Application March 26, 1934, Serial No. 717,389

4 Claims. (Cl. 23—229)

This invention relates generally to processes for the recovery of elementary sulphur from its ores, and deals more particularly with an improved method of extracting sulphur from the earthy or gangue constituents of the ore by continuous filtration, after the ore has been reduced to a molten mass by heating and liquefying the contained sulphur.

While methods for recovering sulphur from its ores by filtration of molten sulphur are commonly known in the art, such methods have had for the most part the disadvantageous characteristic of intermittent or batch operation, requiring frequent interruptions for the purpose of cleaning the filter elements, with resultant expense and delay in production. My principal object is to provide a method for successfully filtering liquid sulphur from the ore residue by a continuous operation that will obviate the numerous disadvantages incident to batch-type methods.

In accordance with the invention, I apply a mixture of molten sulphur and the gangue residue (for example organic solids, gypsum or talclike earthy constituents) of the ore, to a continuously driven, endless filter element, and filter the sulphur by applying differential pressures to a portion of the length of the filter element. Thereafter I remove the deposited gangue cake from the filter element preferably by passing hot gases therethrough in one or more stages, and complete the removal of residue by forcing through the filter, liquid sulphur which may conveniently be a portion of the filtrate. The wash liquid sulphur is then returned to the molten mass being filtered. During the filtering stage, I preferably maintain the filter element in an atmosphere heated to a temperature at or above the melting point of the sulphur in order that no solidification on the filter can occur, and in order that the sulphur will be maintained in the proper fluid condition required for maximum separation from the gangue.

Figure 2:
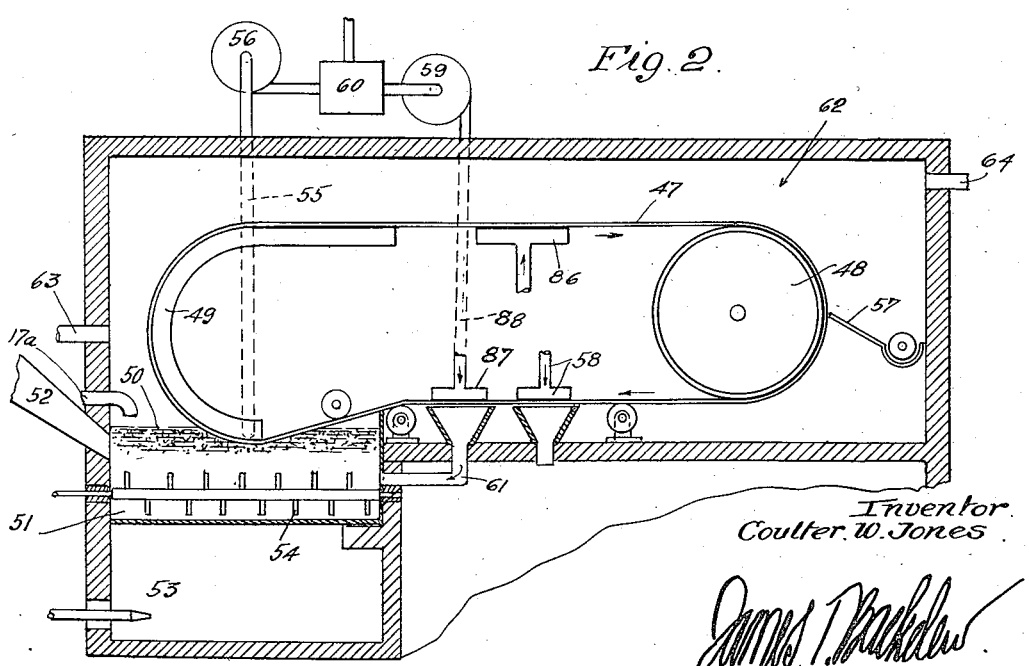
Figure 3:
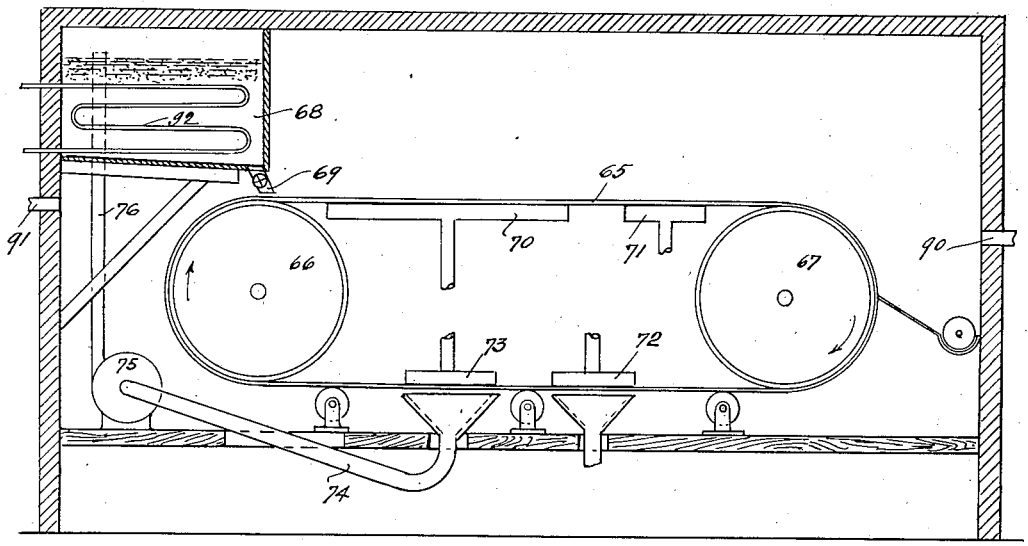

It is to be understood that in carrying out the present method, I am not limited to the use of any particular form of apparatus, since various types of filtering equipment designed for continuous operation, and with or without certain additions and modifications to serve purposes peculiar to my process, may be employed within the scope of the invention. However, in order that the various purposes and objects of the invention, as well as all the various details of the method itself may be most fully understood, I shall describe the invention by referring to certain typical and illustrative types of apparatus shown in the accompanying drawings. The views appearing in the drawings comprise:

Figure 1, a diagrammatic view showing a typical revolving drum type filter;

Fig. 2, a similar view illustrating a variational type of filtering apparatus; and Fig. 3, illustrating a second variational form of filtering apparatus.

In Fig. 1, I show a filter, generally indicated at 10, to which a molten mass comprising liquid sulphur and the earthy or gangue residue of the ore, is supplied from a suitable heating apparatus, of which that indicated at 11 may be regarded as typical. The heater comprises an inclined drum 12 into the upper end of which the sulphur ore is fed through a hopper 13. Drum 12 is mounted above a fire box 14, and is externally heated by hot combustion gases supplied from the burner 15. The sulphur ore is advanced through the inclined drum by means of screw conveyer 16, and is simultaneously heated to a temperature sufficient to melt at least most, and preferably all of the sulphur contained in the ore. The molten mixture is discharged from drum 12 through a screened outlet 17 into the bottom of filter shell 18, wherein the liquid mass is maintained at a suitable level L.

The mixture of liquid sulphur and gangue may be maintained in heated condition within the lower portion of shell 18 by supplying heat thereto in any suitable manner, as for example by the use of steam coil 19. The heat supplied to the liquid body through pipe 19 maintains the sulphur in fluid condition at a temperature above the melting point, and the heat so supplied may also serve to finally melt any of the sulphur constituency of the ore that has not previously become liquid in passing through the heater drum 12.

The filter element proper comprises a drum 20 rotatably driven by suitable means, not shown, in the direction indicated by the arrow. Inasmuch as filters of this general type are well known in the art, a detailed illustration and explanation of structural features will be unnecessary, and the diagrammatic showing will suffice for present purposes. Drum 20 is journaled on stationary trunnion 21, and is so positioned within shell 18 that its lower portion dips within the body 22 of the sulphur and gangue mixture. A suitable filtering medium or layer 23 carried on the surface of the drum 20, is supported on the usual foraminous or apertured backing 24 which allows the liquid being filtered to pass through into the suction nozzle, hereinafter described, and the filter cleansing fluid to be forced in a reverse direction through the filtering medium.

A stationary arcuate suction nozzle, diagrammatically indicated at 25, is positioned within drum 20 so as to extend from a suitable point below the liquid level L a substantial distance in the direction of rotation of the drum, suction being applied to nozzle 25 by way of one or more pipes 26 connecting through the solid trunnion 21 with line 27 leading to vacuum pump 28. As the lower portion of the drum 20 passes through the molten mixture 22, a film of the mixture is applied to the surface of the filtering medium 23, and as the latter travels past the suction nozzle 25, the liquid sulphur is drawn through the filtering medium, leaving the gangue deposited as a cake on the surface. In order to maintain a uniform constituency of the mixture throughout the fluid body 22, the latter may be continuously agitated by a suitable mixing device 22a. During the course of travel of the filtering medium past the suction nozzle, substantially all of the liquid sulphur in the mixture adhering to the surface of the drum, will have become filtered and drawn through pipes 26 and 27 into the pump 28. The suction nozzle will also draw through the filtering medium sufficient hot gas from the space 32 to displace all liquid sulphur from the gangue cake and from the pores of the filtering element itself. It will be understood that filter layer 23 may consist of fabric, screen or any other suitable substance or form of material resistant to and adaptable to the filtering of molten sulphur.

In order to most effectively remove the residual deposit of gangue from the surface and pores of the filtering element, I preferably, though not necessarily in all cases, force a suitable fluid outwardly through the filter at a point between the suction nozzle and the scraper blade, to which I hereinafter refer. The cleansing fluid, which preferably will consist of steam or hot gas, is forced under pressure through pipe 30 and nozzle 31, the arcuate extent of which is substantially less than that of suction nozzle 25. It will be understood of course that all of the nozzles extend axially within the filter drum the full width of the filtering medium 24. In being discharged from nozzle 31 through the filtering medium, the steam or hot gases act to loosen the cake on the surface of the filter as well as particles within the pores thereof, and to accomplish a preliminary removal of a portion of the cake by blowing it from the surface of the filtering medium into the upper interior chamber 32 of the filter shell.

Further removal of the filter cake is effected by means of the inclined scraper blade 33, the portion of the cake removed by the blade being carried from the shell by screw conveyor 34. In addition to, or in lieu of nozzle 31, I may provide at a point below the scraper blade 33, a nozzle 35 supplied with steam or hot gas through pipe 36, this nozzle serving to direct the gas through the filtering medium so as to remove from the interstitial pores of the latter, particles of the cake that could not be reached by the scraper blade 33, or that have become embedded by the action of the blade.

In order to insure removal of the cake particles from the pores of the filtering medium to the fullest possible extent, I preferably provide a final cleansing and washing stage in which liquid sulphur is forced outwardly through the filtering medium, the liquid sulphur thus used being taken from the filtrate drawn through suction nozzle 25 in the filtering stage. While some of the cake particles lodged in the pores of the filtering medium will have been removed by steam or hot air discharged from nozzle 31, and the bulk of the surface cake removed by scraper blade 33, some of the particles may yet remain within the filter element pores. It is these finally remaining particles of gangue residue that it is proposed to remove by passing molten sulphur through the filter element, the liquid sulphur being particularly efficacious as a final washing fluid by reason of its having substantially greater viscosity than the gas.

I show the suction pump 28 to discharge into a separator 38 wherein any gas is removed from the filtrate being finally discharged through line 39. A portion of the filtrate is forced by pump 40 via pipes 41, 42 and nozzle 43 through the filter layer 24 at a point below scraper blade 33, and in the specific instance illustrated, at a point below nozzle 35. The liquid sulphur, by reason of its comparatively higher viscosity, effectively accomplishes final removal of the cake particles from within the filtering material by washing through the pores thereof at substantial velocity. After being forced through the filtering medium, the liquid sulphur discharged from nozzle 43 drains down into the liquid body 22 to be again picked up on the surface of the filter drum.

It may sometimes happen that the sulphur content of the ore is so low that the molten mixture 22 will not have sufficient fluidity for successful handling by the filter drum. In this event a sulphur and gangue mixture of the necessary fluidity may be provided by introducing to the mixture a certain amount of elementary sulphur, either in solid or liquid form. This make-up sulphur may be combined with the ore being heated in the heater 11, or the sulphur may be added directly to the mixture 22 within the bottom of the filter shell.

To insure that the sulphur will be maintained in proper fluid condition while undergoing filtration under the influence of suction nozzle 25, I preferably maintain the filter drum in an atmosphere heated to a temperature at least above, and if desirable, to a temperature substantially in excess of the melting point of the sulphur. Accordingly, the temperature in chamber 32 will be maintained at around 240° F. or above. Ordinarily, when hot gases or steam are being discharged through nozzles 31 and 35, the gas will carry sufficient heat to maintain the desired temperature conditions within chamber 32, but if the gas is not sufficiently high in temperature, or is not used at all, chamber 32 may be heated to the desired temperature by hot gas introduced through inlet 45 and discharged through outlet 46.

The modified form of apparatus shown in Fig. 2, while fundamentally similar to the described type, differs primarily in the use of an endless filter belt having horizontally extending spans, instead of a filtering medium carried on a revolving drum. In Fig. 2, a belt 47 of suitable filtering material passes around and is driven in the direction indicated by the arrows, by rotating drum 48. At the opposite end of its spans, the filter belt passes over a suction nozzle 49, the lower portion of which extends beneath the level of a body 50 of molten sulphur and gangue maintained in heated condition within container 51. The ore may have been previously heated, the contained sulphur melted and the mixture discharged through inlet 17a into container 51, or the ore may be fed directly into the container through hopper 52 and the sulphur completely melted by heat supplied from combustion chamber 53. The mixture 50 preferably is kept uniform during heating by the operation of a suitable agitator 54.

As in the previously described form, the liquid sulphur applied to the filter belt during the passage of the latter through the mixture 50, is drawn into the suction nozzle 49 and is taken through pipe 55 to the pump 56. Subsequently, hot gas or steam may be blown through the filter belt from nozzle 86, the filter cake further removed by scraper 57, and, if desired, a second stream of hot gas or steam passed through the filter from nozzle 58. Liquid sulphur is supplied nozzle 87 via line 88 leading from pump 59, the latter taking sulphur from separating chamber 60. After being forced through the filter belt, the liquid sulphur is returned to container 51 by way of pipe 61. As before, the filter belt is maintained in an atmosphere heated to a temperature above the melting point of sulphur, the heat being contained in gases discharged through nozzles 86 and 58, or in hot gases circulated through chamber 62 by way of inlet 63 and outlet 64.

The form of apparatus shown in Fig. 3 differs primarily from that of Fig. 2, in that the endless filter belt 65 carried on drum 66 and 67 receives the sulphur and gangue mixture to be filtered from container 68 through valve controlled outlet 69, the mixture in this case being caused to flow onto the filter instead of the latter being passed through a quiescent body of the mixture. The quantity of the molten mixture deposited on the filter belt through outlet 69 is regulated in accordance with the capacity of suction nozzle 70 to effect substantially complete filtration of the sulphur. Nozzles 71, 72 and 73 correspond in function to nozzles 31, 35 and 43, respectively, heretofore described more in detail in connection with Fig. 1. The filter wash sulphur discharged through the filter belt by nozzle 73, is taken via line 74 to pump 75 and thence returned through pipe 76 to the molten mixture in tank 68. As in the earlier described forms, the atmosphere through which the filter belt passes may be maintained at a temperature above the melting point of sulphur by the hot gases discharged from nozzles 71 and 72, or proper temperature conditions may be maintained by passing hot gas through the apparatus between inlet 90 and the outlet 91. A steam coil is shown at 92 for the purpose of maintaining the mixture to be filtered, in proper fluid condition.

I claim:

1. The method that includes, heating sulphur ore to form a mixture of gangue and liquid sulphur, passing an endless filter element in contact with a body of said mixture, applying a pressure differential to opposite sides of said element to filter the liquid sulphur therethrough, and continuously removing the gangue residue from the filter element by forcing liquid sulphur through said element toward the surface carrying the gangue residue.

2. The method that includes, heating sulphur ore to form a mixture of gangue and liquid sulphur, passing an endless filter element in contact with a body of said mixture, applying a pressure differential to opposite sides of said element to filter the liquid sulphur therethrough, continuously removing the gangue residue from the filter element by forcing liquid sulphur through said element toward the surface carrying the gangue residue, and passing the last mentioned liquid sulphur into said mixture being filtered.

3. The method that includes, heating sulphur ore to form a mixture of gangue and liquid sulphur, passing an endless filter element in contact with a body of said mixture, applying a pressure differential to opposite sides of said element to filter the liquid sulphur therethrough, and continuously removing the gangue residue from the filter element by forcing a portion of filtered sulphur through said element toward the surface carrying the gangue residue, and returning the liquid sulphur thus passed through the filter element, to said mixture.

4. The method that includes, heating sulphur ore to form a mixture of gangue and liquid sulphur, passing an endless filter element in contact with a body of said mixture, applying a pressure differential to opposite sides of said element to filter the liquid sulphur therethrough during a portion of the path of travel of the endless element, passing a cleansing medium through the filter element during another portion of its path of travel to remove residue therefrom, and passing liquid sulphur through the element during another portion of its path of travel and in a reverse direction to that of the sulphur during the filtering action, to remove residue from said element.

COULTER W. JONES.